US012650882B1

(12) United States Patent
Zhou et al.

(10) Patent No.: US 12,650,882 B1
(45) Date of Patent: Jun. 9, 2026

(54) MACHINE LEARNING MODEL WEB

(71) Applicant: Amazon Technologies, Inc., Seattle, WA (US)

(72) Inventors: Chao Zhou, Fremont, CA (US); Patrick Sisterhen, Georgetown, TX (US); Ravish Hastantram, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 493 days.

(21) Appl. No.: 18/194,354

(22) Filed: Mar. 31, 2023

(51) Int. Cl.
*G06F 9/50* (2006.01)

(52) U.S. Cl.
CPC .......... *G06F 9/5027* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 7,266,827 | B1 * | 9/2007 | Sievert | G06F 9/547 |
| | | | | 719/330 |
| 8,005,812 | B1 * | 8/2011 | Mosterman | G06F 16/2457 |
| | | | | 707/723 |
| 2017/0286864 | A1 * | 10/2017 | Fiedel | G06F 9/546 |
| 2018/0060759 | A1 * | 3/2018 | Chu | G06N 20/00 |
| 2018/0293517 | A1 * | 10/2018 | Browne | G06N 5/04 |
| 2020/0311613 | A1 * | 10/2020 | Ma | G06N 20/20 |
| 2022/0035878 | A1 * | 2/2022 | Sarah | G06N 3/082 |
| 2022/0036194 | A1 * | 2/2022 | Sundaresan | G06N 3/0464 |
| 2022/0207418 | A1 * | 6/2022 | Cardoso | G06F 9/45558 |
| 2024/0127159 | A1 * | 4/2024 | Chellappa | G06N 20/00 |

FOREIGN PATENT DOCUMENTS

| | | | | |
|---|---|---|---|---|
| WO | WO-2020264335 | A1 * | 12/2020 | G06N 3/045 |
| WO | WO-2021056389 | A1 * | 4/2021 | G06N 3/045 |

* cited by examiner

*Primary Examiner* — Charles E Anya
(74) *Attorney, Agent, or Firm* — Nicholson De Vos Webster & Elliott LLP

(57) ABSTRACT

Techniques for building and maintaining model webs are described. In some examples, a model web is built by selecting models for the model web from one or more available model types based on at least one or more of availability, tensor information, and compute type, instantiating synapses between the selected models to form the model web and updating information regarding availability of the selected models of the model web to indicate being in use.

20 Claims, 13 Drawing Sheets

MODEL
INFORMATION
212

| MODEL NAME | MODEL TYPE | INPUT | OUTPUT | AVAILABLE | COMPUTE TYPE | LOCATION | SECURITY INFORMATION |
|---|---|---|---|---|---|---|---|
| MODEL A | OBJECT RECOGNITION | TENSOR DESCRIPTION (SHAPE(S)) | TENSOR DESCRIPTION (SHAPE(S)) | YES | GPU1 | LOC | HASH, BLOCK CHAIN INFO |
| MODEL B | OBJECT RECOGNITION | TENSOR DESCRIPTION | TENSOR DESCRIPTION | NO | GPU2 | LOC | HASH, BLOCK CHAIN INFO |
| . . . | | | | | | | |
| MODEL N-1 | TEXT RECOGNITION | TENSOR DESCRIPTION | TENSOR DESCRIPTION | YES | CPU2 | LOC | HASH, BLOCK CHAIN INFO |
| MODEL N | TEXT RECOGNITION | TENSOR DESCRIPTION | TENSOR DESCRIPTION | YES | FPGA | LOC | HASH, BLOCK CHAIN INFO |

*FIG. 3*

MODEL
SYNAPSE
STATUS 216

| SYNAPSE | MODEL NAMES | STRENGTH |
|---|---|---|
| 0 | DATA SOURCE : MODEL A | 10 |
| 1 | MODEL A : MODEL C | 10 |
| 2 | MODEL C : MODEL E | 9 |
| . . . | | |
| N-1 | | |
| N | | |

*FIG. 4*

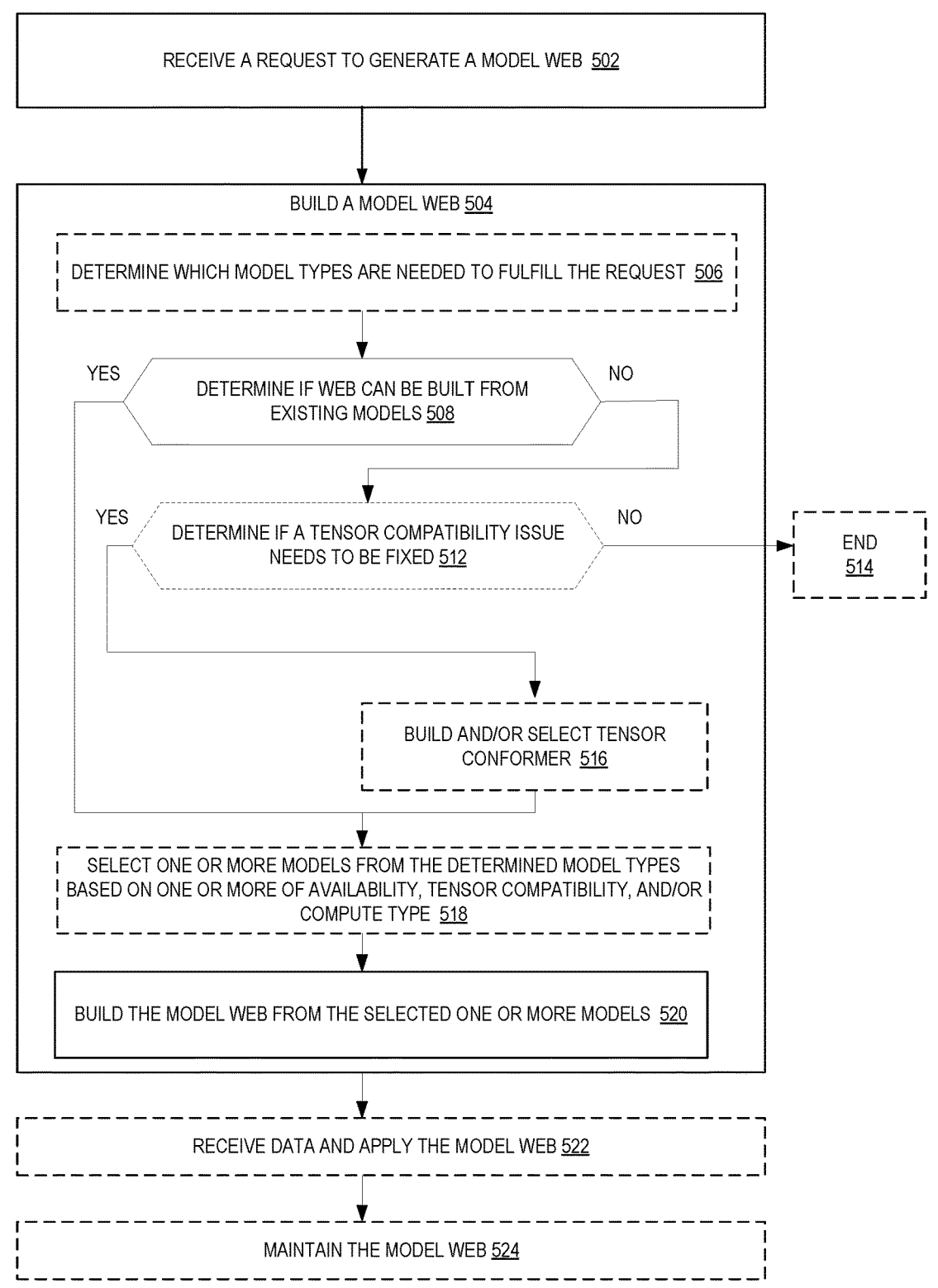

RECEIVE A REQUEST TO GENERATE A MODEL WEB 502

BUILD A MODEL WEB 504

DETERMINE WHICH MODEL TYPES ARE NEEDED TO FULFILL THE REQUEST 506

YES     DETERMINE IF WEB CAN BE BUILT FROM EXISTING MODELS 508     NO

YES     DETERMINE IF A TENSOR COMPATIBILITY ISSUE NEEDS TO BE FIXED 512     NO     END 514

BUILD AND/OR SELECT TENSOR CONFORMER 516

SELECT ONE OR MORE MODELS FROM THE DETERMINED MODEL TYPES BASED ON ONE OR MORE OF AVAILABILITY, TENSOR COMPATIBILITY, AND/OR COMPUTE TYPE 518

BUILD THE MODEL WEB FROM THE SELECTED ONE OR MORE MODELS 520

RECEIVE DATA AND APPLY THE MODEL WEB 522

MAINTAIN THE MODEL WEB 524

FIG. 5

MODEL WEB - CREATION

*CREATE OR EDIT A MODEL WEB*

*INPUT SOURCE(S)*

601

| INPUT | SOURCE LOCATION |
| --- | --- |
| TENSOR DESCRIPTION | DESCRIPTION |

*MODEL WEB SYNAPSE(S)*

INPUT: MODEL TYPE A: MODEL TYPE B : MODEL TYPE C :
         MODEL TYPE F

INPUT: MODEL TYPE A: MODEL TYPE D : MODEL TYPE F

603

CANCEL     CREATE

*FIG. 6*

MODEL WEB - CREATION

CREATE OR EDIT A MODEL WEB

INPUT SOURCE(S)

701

| INPUT | SOURCE LOCATION |
|-------|-----------------|
| TENSOR DESCRIPTION | DESCRIPTION |

MODEL WEB SYNAPSE(S)

INPUT: MODEL TYPE A

MODEL TYPE A: MODEL TYPE B

MODEL TYPE B : MODEL TYPE C

MODEL TYPE C: MODEL TYPE F

INPUT: MODEL TYPE D

MODEL TYPE D: MODEL TYPE F

703

CANCEL     CREATE

*FIG. 7*

MACHINE LEARNING MODEL WEB

BACKGROUND

Machine learning models can be connected via their input and output tensors (directly or indirectly) to form model webs for complex prediction tasks. The connections between models in a model web decide how the web handles collective prediction requests.

For example, models related to vision processing could be connected to work together in a model web to detect objects. For example, a model web consisting of a mixed-input classification model whose input is connected to the output of two object isolation models that each process a camera feed could be used to detect isolated objects.

A model web may also change over time. For example, in the example model web described above, if one of the camera feeds is no longer available, then that camera's isolation model should be removed from the model web.

BRIEF DESCRIPTION OF DRAWINGS

Various examples in accordance with the present disclosure will be described with reference to the drawings, in which:

FIG. 3 illustrates examples of model information.

FIG. 4 illustrates examples of model synapse status for a model web.

FIG. 5 is a flow diagram illustrating operations of a method for model web usage according to some examples.

FIG. 6 illustrates examples of a GUI to be used to create a model web.

FIG. 7 illustrates examples of a GUI to be used to create a model web.

DETAILED DESCRIPTION

The present disclosure relates to methods, apparatus, systems, and non-transitory computer-readable storage media for building, using, and/or maintain a model web.

In current designs for model webs, the connections between models of a model web are typically fixed and require manual construction. For example, in the model web consisting of a mixed-input classification model whose input is connected to the output of two object isolation models of the background those connections are manually created. Moreover, the person that is the model web builder that makes the connections needs to know what the outputs of the object isolation models look like (their shapes that could be different) and if the mixed-input classification model can accept those shapes.

Other issues may arise. For example, if one of the cameras of the background is taken offline that means the object isolation model for that camera no longer should be a part of the web as it will not be providing data that is necessary for the task of detecting objects for the set of cameras. Moreover, if that isolation model is left in the model web, it actually could be providing bad data to the mixed-input classification model. However, the current state of the art is for As such, changes to a model web (e.g., a model is updated, a model is no longer available, an input goes offline, a server hosting one of the models goes down, etc.) are manually handled in that the model web builder has to re-evaluate the model web and manually make changes as needed.

Detailed herein are examples that utilize one or more model synapses (connections) to connect two or more models using their inputs and outputs to solve a defined problem. Model synapses are model connections that are used to form prediction paths in a model web. The use of model synapses provides a model web with memory of a prediction path and enables a model web to actively adapt to a changing and unknown environment. In some examples, a synapse comprises one or more of a physical bus, a logical bus, a handshaking protocol, a point-to-point link, etc.

While the synapses may be made manually (for example, using a graphical user interface), examples detailed herein allow a user to define a model web without the need to make explicit connections (direct or indirect). Additionally, examples detailed herein describe mechanisms for automatically maintaining a model web over its life including the maintenance of existing synapses, the creation of new synapses as appropriate, and/or the removal of synapses as appropriate.

Figure 1:
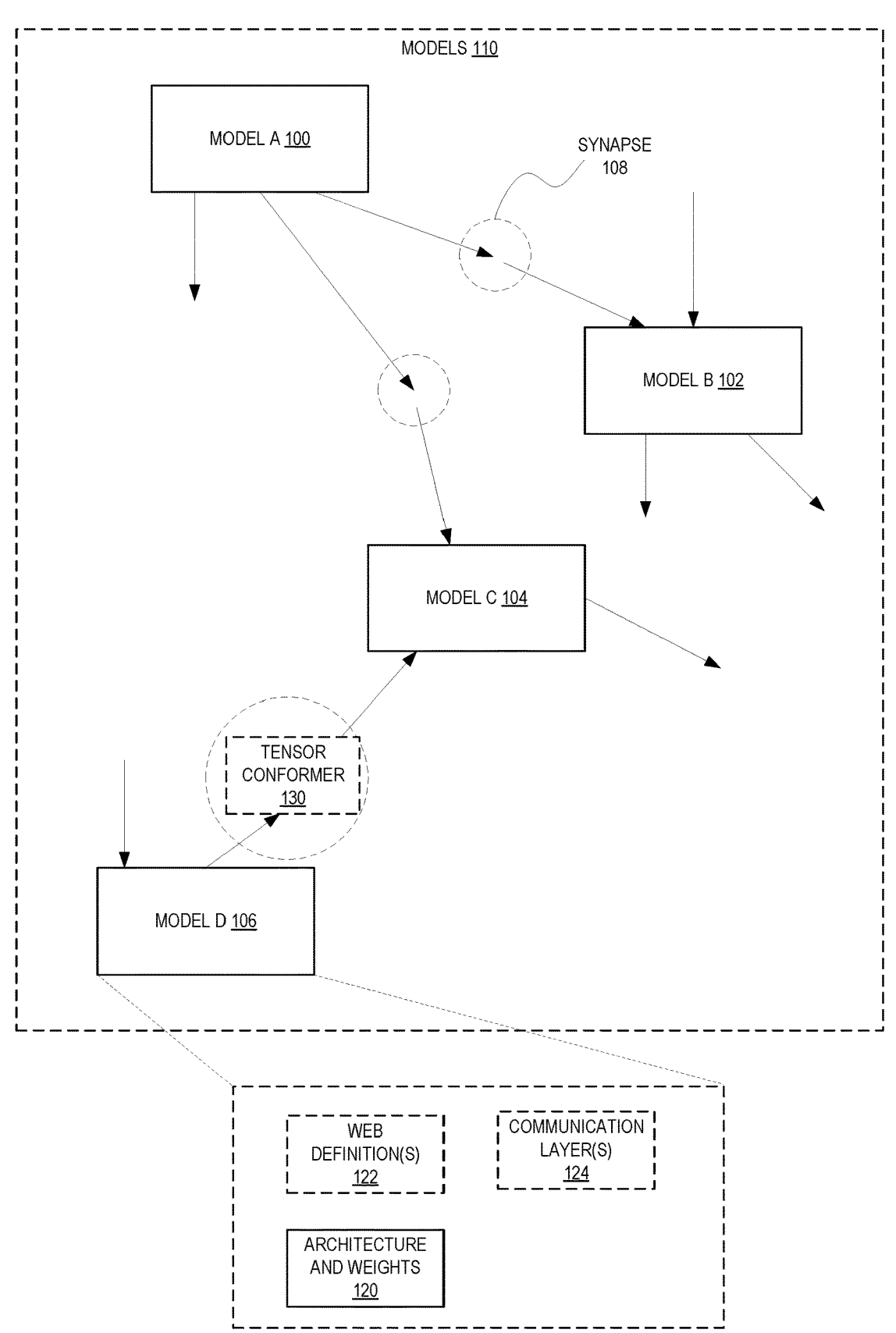
FIG. 1 illustrates examples of a model web.

FIG. 1 illustrates examples of a model web. As shown, a model web is a collection of one or more interconnected models 110 where an output of one model may serve as an input to another model. Models of a model web may be in a shared memory (e.g., on the same physical machine), dispersed amongst different hardware devices, dispersed amongst different physical locations, etc.

In this example, an output (e.g., one or more tensors) from model A 100 is provided to model B 102 and model C 104 and the output of model D 106 is provided to model C 104.

The connections between these models are called synapses (synapse 108 is highlighted). In some examples, synapses are formed between models by a model looking for other models whose inputs can accept its outputs. This will be discussed below with respect to publishing of model capabilities, availability, etc.

In some examples, a model includes an architecture and weights 120. In some examples, the model includes or is wrapped by one or more of at least one web definition 122 and/or at least one communication layer 124. A web definition 122 defines a web including inputs and outputs of various models or model types within the web. A web definition 122 may also include model information and model synapse status for other models.

Communication layer(s) 124 are used to route input(s) and/or output(s) from a model. A communication layer 124 may perform some data transformation. For example, the communication layer 124 may convert between data types (e.g., floating point to integer), shape the data (e.g., apply a quantization factor), etc.

In some examples, a communication layer 124 is used to communicate with other models or a model service to determine what models are available and if the model web should be updated based on availability and capability. In some examples, a model will publish its availability, etc. The publication could be for a pre-defined set of items, encrypted, multi-casted, etc.

In some examples, management software (not shown in this figure) may be used and may be aware of model capabilities and the statuses of various models that could be a part of a web and makes connections between these models. In some examples, the models themselves track connections, statuses, capabilities, etc.

In some examples, a model synapse is not permanent. According to various embodiments, model synapses are used to create at least a subset of a model web and broken if not used. Note that in some examples sections of a model web may be built and/or taken down dynamically. This may be needed in systems with limited resources. A break may be because of a lack of usage for a period of time, a model becoming unavailable (e.g., the hardware running the model goes down, etc.), etc. In some examples, when a model synapse is first formed, a connection strength is set on both sides of the connection. The strength is decreased over time and is increased with usage. In another words, connections in a model web have duration. A specific connection can degrade over time and be enhanced by refreshed usage. For example, when a connection is not used it may be marked as not being as important to maintain as other connections in the model web. In some examples, timing for the degradation is configurable. For example, a user may indicate during the building or maintenance of a model web how degradation is to be calculated (e.g., every 5 ms degrade the connection bond, etc.) The freeing-up of a model from a web enables it to form new connections with other models. In some examples, the strength indication serves as an indication of where in the model web data has traveled (that is a path).

Figure 2:
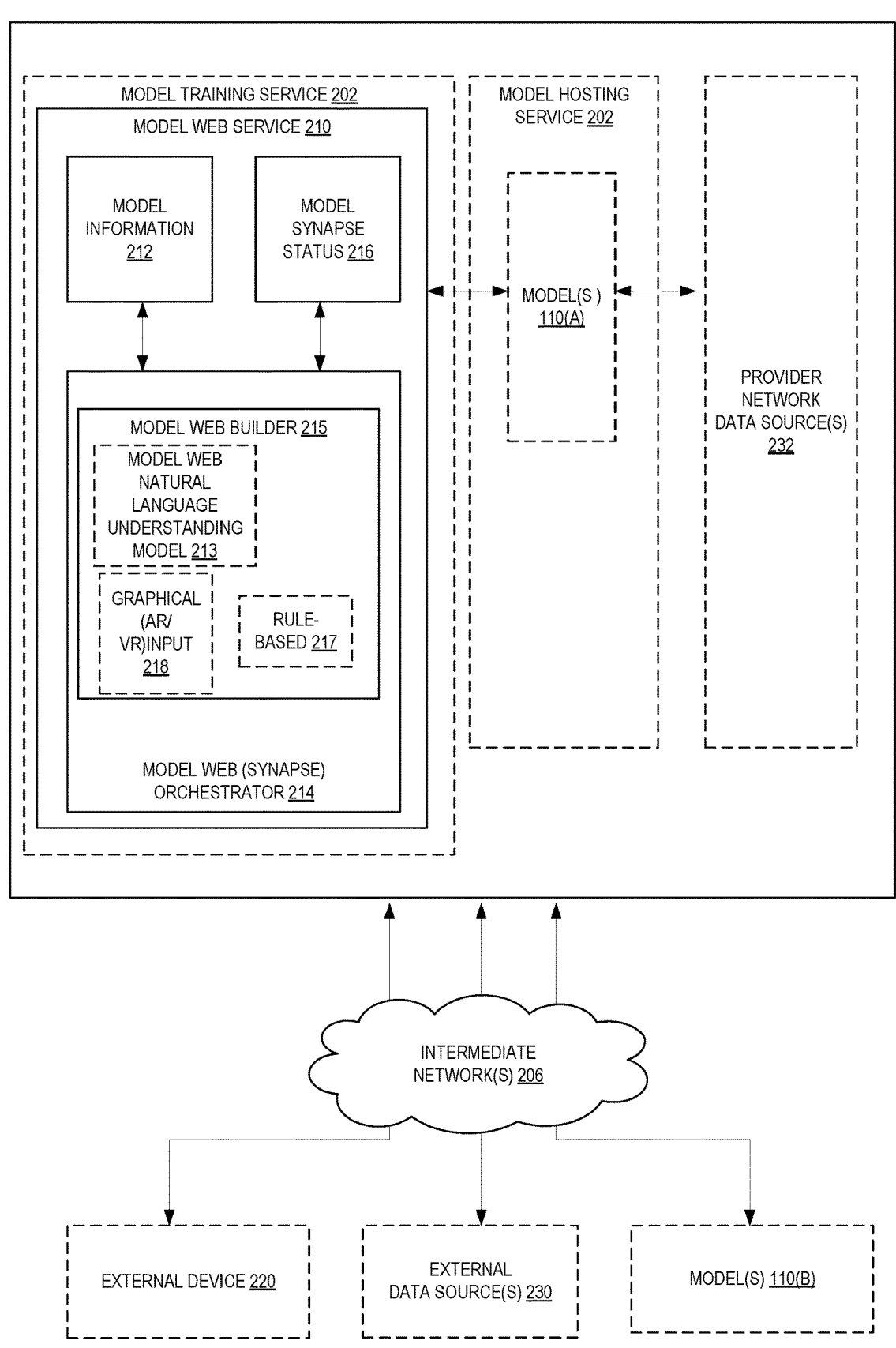
FIG. 2 illustrates examples of at least a model web service.

FIG. 2 illustrates examples of at least a model web service. In the illustration, a model web service 210 is used to generate and/or maintain a model web. At least some models 110(A) of model web may be hosted (e.g., using model hosting service 202) on a provider network 200 and/or at least some models 110(B) may be external to a provider network 200.

In some examples, the model web service 210 maintains model information 212 for models that may be a part of a web. FIG. 3 illustrates examples of model information. Model information 212 allows for the model web service 210 to have an idea of one or more of what capabilities a model has (e.g., model type), what the input and/or output (e.g., a tensor description or shape) of a given model are, if a model is available for use, a compute type (e.g., GPU, CPU, accelerator, etc.), security information, and/or a location of the model (e.g., a particular server or machine, a datacenter, a state or country, etc.).

In some examples, a model is available for use if it is not a part of another model web. In some examples, a model is available if it is loaded in memory and ready for use. In some examples, a model is available if it could be loaded into memory to be ready for use.

In some examples, the model web service 210 maintains model synapse status 216. FIG. 4 illustrates examples of model synapse status for a model web. In this illustration, information for a particular synapse includes the connection (s) made between models and/or a data source and, in some examples, a strength of the connection. As noted above, in some examples synapses have an associated strength that degrades over time or lack of use. The strength is increased if there is use. Note that model becoming unbreakable would break the synapse regardless of the strength.

In some examples, the model web (synapse) orchestrator 214 provides model web builder 215 that allows a user to define a model web (model web definition) or a model web template. In some examples, a user defined model web (model web definition) uses particular models for the web whereas a model web template defines a web by model type.

In some examples, the model web (synapse) orchestrator 214 utilizes a model web natural language understanding model 213 to generate or maintain a model web. The model web natural language understanding model 213 takes in at least natural language text about what the model web is to accomplish (a goal) and builds a web template or web to meet that goal. In some examples, the model web natural language understanding model 213 also takes in input data information to be used to understand how the input data will be formatted. In some examples, the model web (synapse) orchestrator 214 selects or generates data transformers to be used before data is input into a model (such that the data is on the shape expected by the model). In some examples, the natural language understanding model 213 uses a prompt-based model to define, build, and/or maintain a model web. In some examples, this model is a Transformer-based model such as a generative pre-trained Transformer model.

In some examples, a rule-based mechanism 217 is used to build a model web based on input from a user. The input may include items such as a description, connections to make with model types, etc.

In some examples, the model web builder 215 accepts graphical input 218 (such as virtual or augmented reality input) to define, build, and/or maintain a model web. The graphical input 218 is fed to either the rule-based mechanism 217 or the model web natural language understanding model 213.

A hosted model web 110(A) or external model web 110(B) may utilized provided network data source(s) 232 or external data source(s) 230. In some examples, an external device 220 is used to build and/or maintain a model web.

The provider network 200 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 200 can use one or more user accounts that are associated with a customer account, though these terms can be used somewhat interchangeably depending upon the context of use. Users can interact with a provider network 200 across one or more intermediate networks 206 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 200 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 200 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 200 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity-such as the provider network itself—that can be executed on demand. Serverless functions can be maintained within the provider network by an on-demand code execution service and can be associated with a particular user or account or can be generally accessible to multiple users/ accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 200. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 200 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

FIG. 5 is a flow diagram illustrating operations of a method for model web usage according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model web (synapse) orchestrator 214 of the other figures.

A request to generate a model web is received at 502. In some examples, the request includes one or more of: a model web template, an indication of one or more input sources, a description of input tensor(s), an indication of where to store a result of the model web, an indication of a location for models of the model web, an indication of a type of compute to use for one or more models of the model web, a model web definition, an indication of strength metrics (e.g., degradation timing, etc.) to use, an indication of a goal to be accomplished, etc. In some examples, the request is one or more API calls. In some examples, the request is input using one or more graphical user interfaces (GUIs).

FIG. 6 illustrates examples of a GUI to be used to create a model web. In this illustration, a user provides input source information 601 (input location and description) and a textual representation of the model by using model web types 603. The use of the colon (:) indicates synapse to be made.

FIG. 7 illustrates examples of a GUI to be used to create a model web. In this illustration, a user provides input source information 701 (input location and description) and a textual representation of the model by using model web types 703. The use of the colon (:) indicates synapse to be made.

Figure 8:
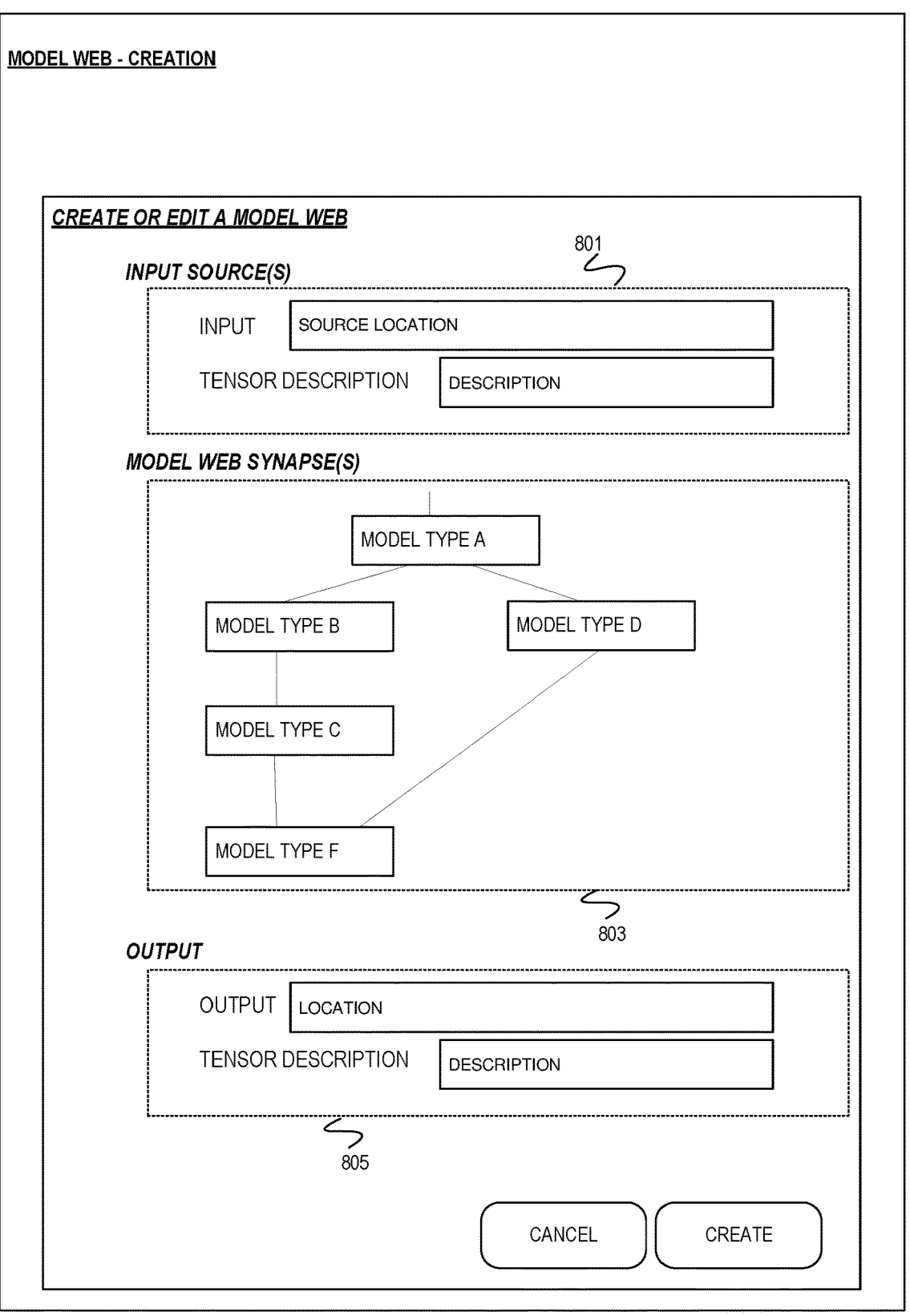
FIG. 8 illustrates examples of a GUI to be used to create a model web.

FIG. 8 illustrates examples of a GUI to be used to create a model web. In this illustration, a user provides input source information 801 (input location and description) and a graphical representation of the model by using model web types 803. This illustration also provides information about what output 805 (output location and tensor description).

A model web is built at 504.

In some examples, a determination of which model types are needed to fulfill the request to generate a model web is made 506. For example, if the request does not include a template or definition, in some examples pre-made templates are consulted to find a template. In some examples, a model is used to determine a template. In some examples, the determination comprises traversing a template to determine what model types are in the template.

A determination of if a model web can be built from existing models is made at 508. For example, are there models that fit the model types or the definition available or could be made available to generate the model web? This information may be found by consulting the model information 212 and the model synapse status 216. In some examples, the model information 212 and model synapse status 216 is maintained by an orchestrator by pinging models. In some examples, the model information 212 and model synapse status 216 is maintained by an orchestrator by receiving published information from models. In some examples, the model information 212 and model synapse status 216 is maintained by an orchestrator by tracking model usage.

When the model web cannot be built, in some examples a determination of if there is a tensor compatibility issue needs to be fixed is made at 512. For example, are the correct model types available, but their tensors are not compatible? If not, then a model web cannot be built and the process ends at 514.

If that is the case, in some examples one or more tensor conformers are built and/or selected at 516 to allow for the mismatched input/output to be fixed.

One or more models are selected from the determined model types based on one or more of availability, tensor compatibility, and/or compute type at 518 in some examples. In some examples, the selection may also take into account the location of a model. For example, in some examples, a request to generate a model web includes an indication that the web is to be built using shared memory of a physical device. In some examples, request to generate a model web includes an indication that the web is to be built that does not use models in a particular location (for example, outside of the United States or a particular data center).

The model web is built from the selected one or more models at 520. In some examples, this comprises instantiating synapses between models, a population of fields in the model information 212 and model synapse status 216, and/or instantiating synapses between models and tensor conformers. Note that "selected" may mean using the specific models of a model web definition.

In some examples, data is received and the model web applied at 522.

In some examples, the model web is maintained at 524. For example, the strength updated based on usage (or lack thereof), synapse updated upon unavailability, synapses updated upon a change in the model web (e.g., a request to change compute type, etc.).

Figure 9:
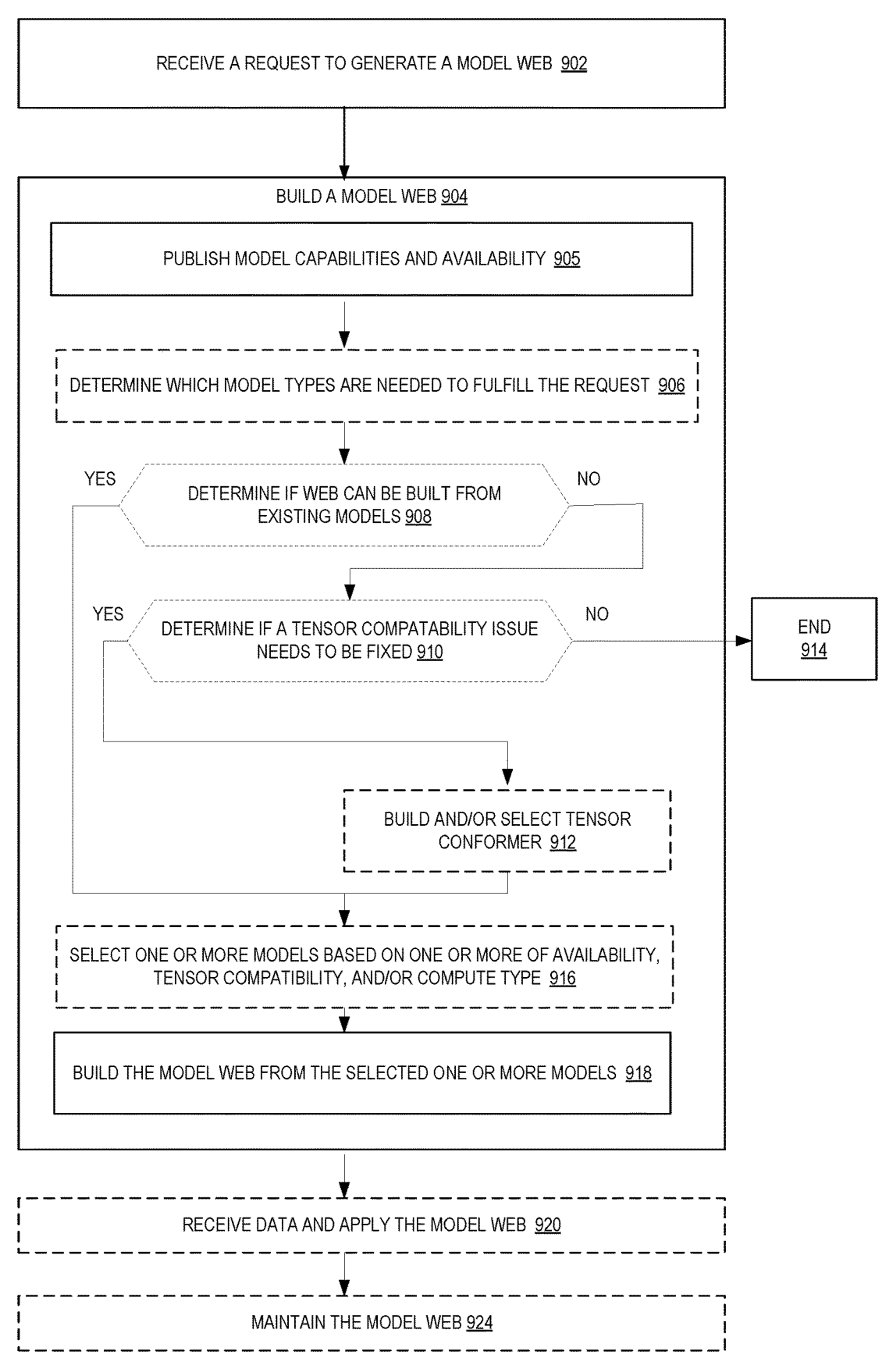
FIG. 9 is a flow diagram illustrating operations of a method for model web usage according to some examples.

FIG. 9 is a flow diagram illustrating operations of a method for model web usage according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the models of the other figures. That is an orchestrator is not involved, or minimally involved.

A request to generate a model web is received at 902. In some examples, the request includes one or more of: a model web template, an indication of one or more input sources, a description of input tensor(s), an indication of where to store a result of the model web, an indication of a location for models of the model web, an indication of a type of compute to use for one or more models of the model web, a model web definition, an indication of strength metrics to use, an indication of a goal to be accomplished, etc. In some examples, the request is one or more API calls. In some examples, the request is input using one or more graphical user interfaces (GUIs). Examples of GUIs have been detailed previously.

A model web is built at 904.

At 905 a publish of model capabilities and availability is made to populate the model information 212 and model synapse 216 as maintained by each model (e.g., as a part of web definitions 122). In some examples, this publish occurs as a model is brought online. In some examples, a publish is made periodically to keep the model information and synapse status up-to-date.

In some examples, a determination of which model types are needed to fulfill the request to generate a model web is made 906. For example, if the request does not include a template or definition, in some examples pre-made templates are consulted to find a template. In some examples, a model is used to determine a template. In some examples, the determination comprises traversing a template to determine what model types are in the template.

A determination of if a model web can be built from existing models is made at 908. For example, are there models that fit the model types or the definition available or could be made available to generate the model web? This information may be found by consulting the model information 212 and the model synapse status 216.

When the model web cannot be built, in some examples a determination of there is a tensor compatibility issue needs to be fixed is made at 910. For example, are the correct model types available, but their tensors are not compatible? If not, then a model web cannot be built and the process ends at 914.

If that is the case, in some examples one or more tensor conformers are built and/or selected at 912 to allow for the mismatched input/output to be fixed. In some examples, an orchestrator performs this task.

One or more models are selected from the determined model types based on one or more of availability, tensor compatibility, and/or compute type at 916 in some examples. In some examples, the selection may also take into account the location of a model. For example, in some examples, a request to generate a model web includes an indication that the web is to be built using shared memory of a physical device. In some examples, request to generate a model web includes an indication that the web is to be built that does not use models in a particular location (for example, outside of the United States or a particular data center).

The model web is built from the selected one or more models at 918. In some examples, this comprises instantiating synapses between models, a population of fields in the model information 212 and model synapse status 216, and/or instantiating synapses between models and tensor conformers. Note that "selected" may mean using the specific models of a model web definition.

In some examples, data is received and the model web applied at 920.

In some examples, the model web is maintained at 924. For example, the strength updated based on usage (or lack thereof), synapse updated upon unavailability, synapses updated upon a change in the model web (e.g., a request to change compute type, etc.).

Figure 10:
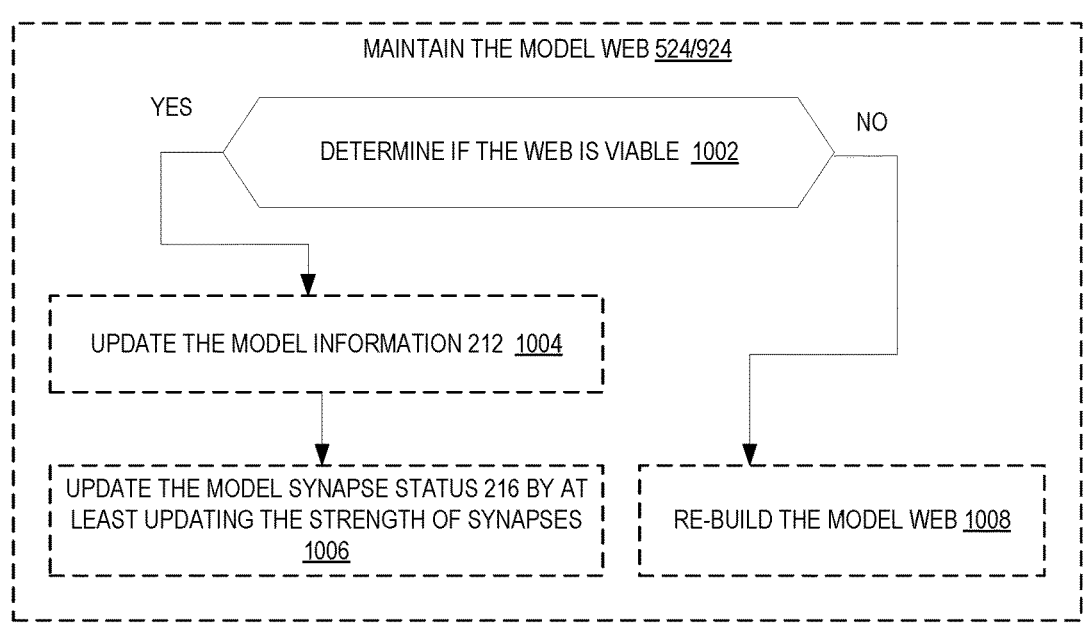
FIG. 10 is a flow diagram illustrating operations of a method for maintaining a model according to some examples.

FIG. 10 is a flow diagram illustrating operations of a method for maintaining a model according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, this corresponds to 524 and/or 924.

At 1002 a determination is made of if the model web is viable is made. For example, are models available to form the web?

If so, then model information 212 is updated as needed at 1004.

The model synapse status 216 is updated by at least updating the strength of synapses at 1006.

If not, then the model web is re-built or attempted to be re-built at 1008.

Figure 11:
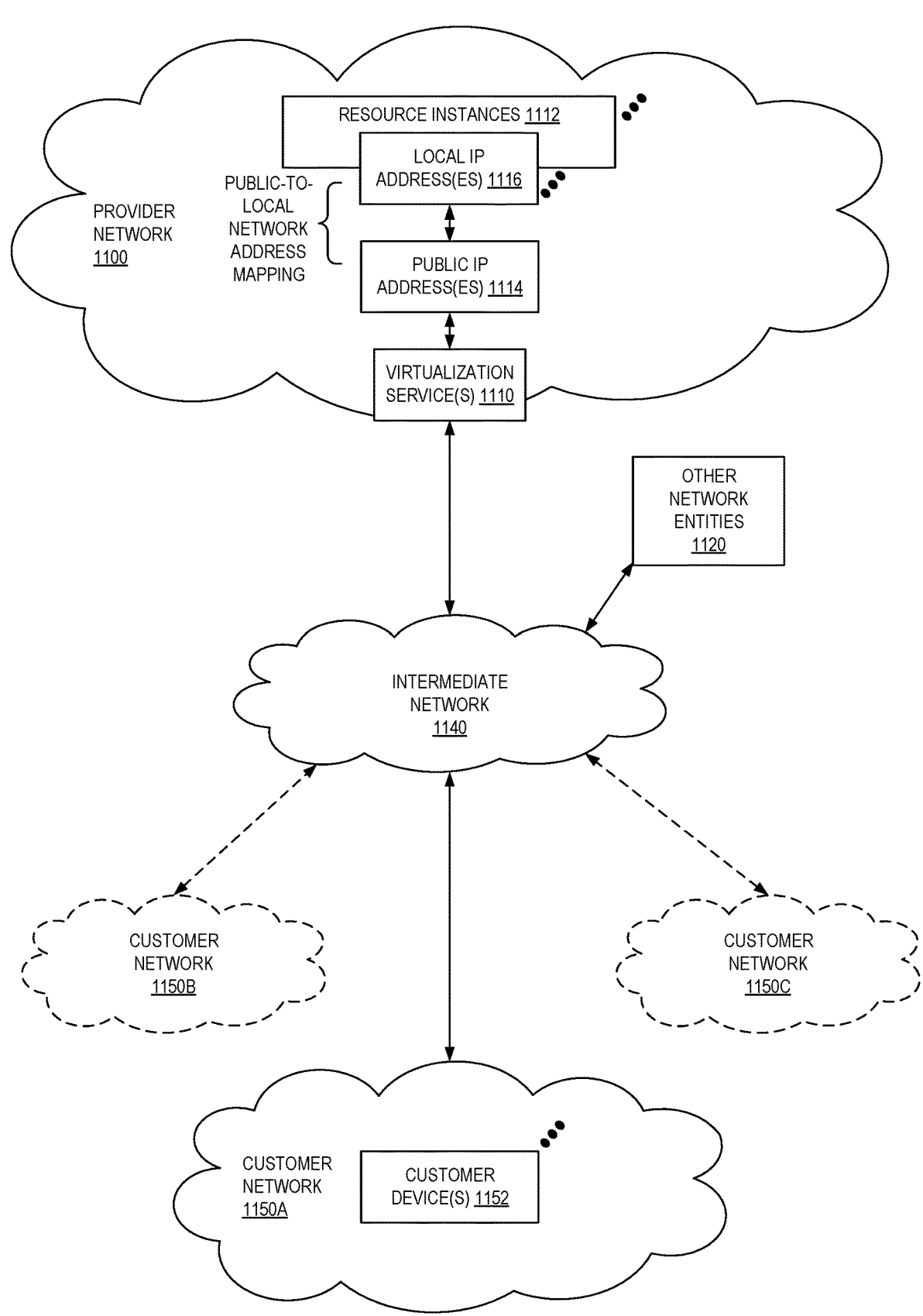
FIG. 11 illustrates an example provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider network 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
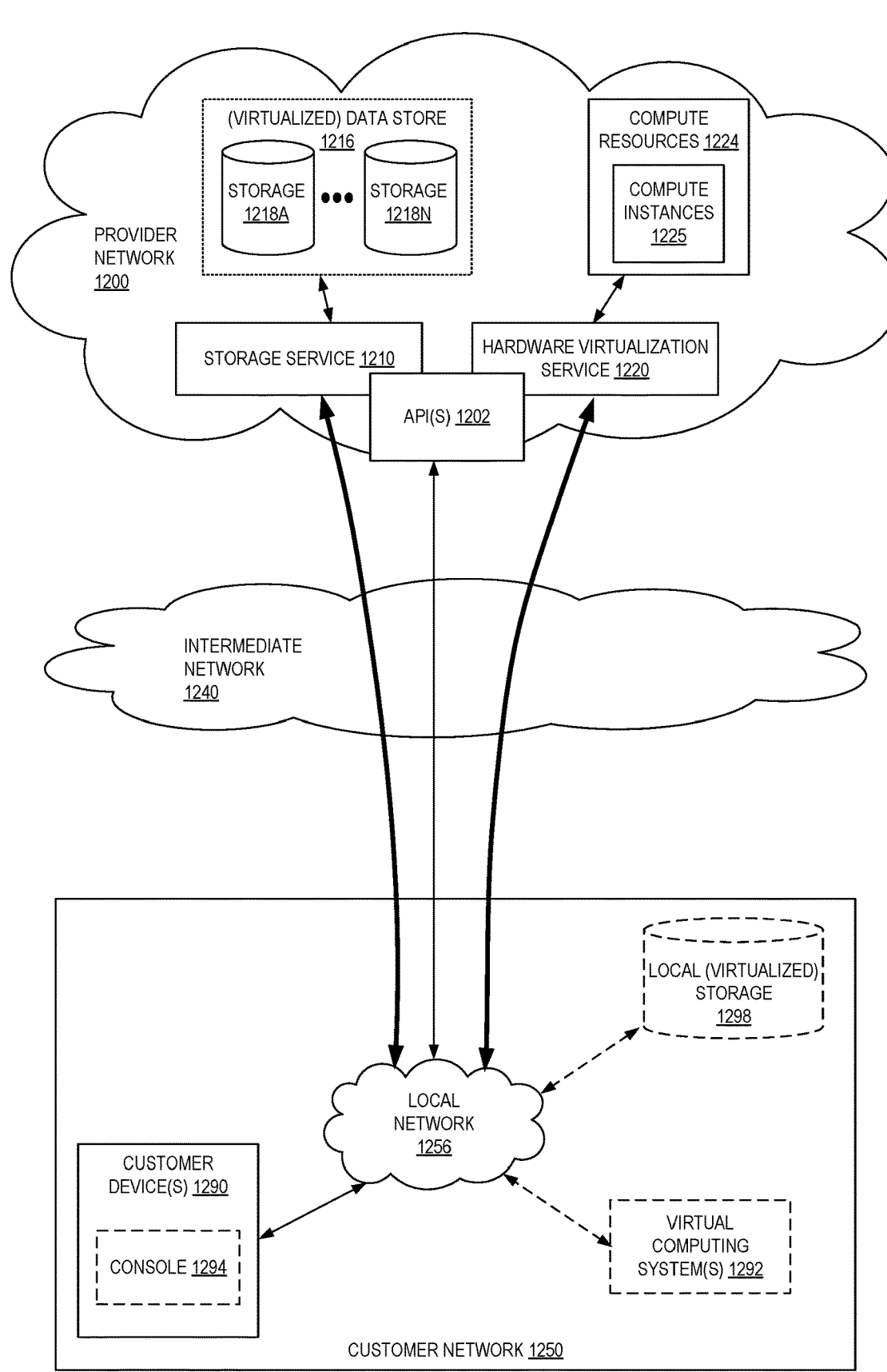
FIG. 12 is a block diagram of an example provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

Figure 13:
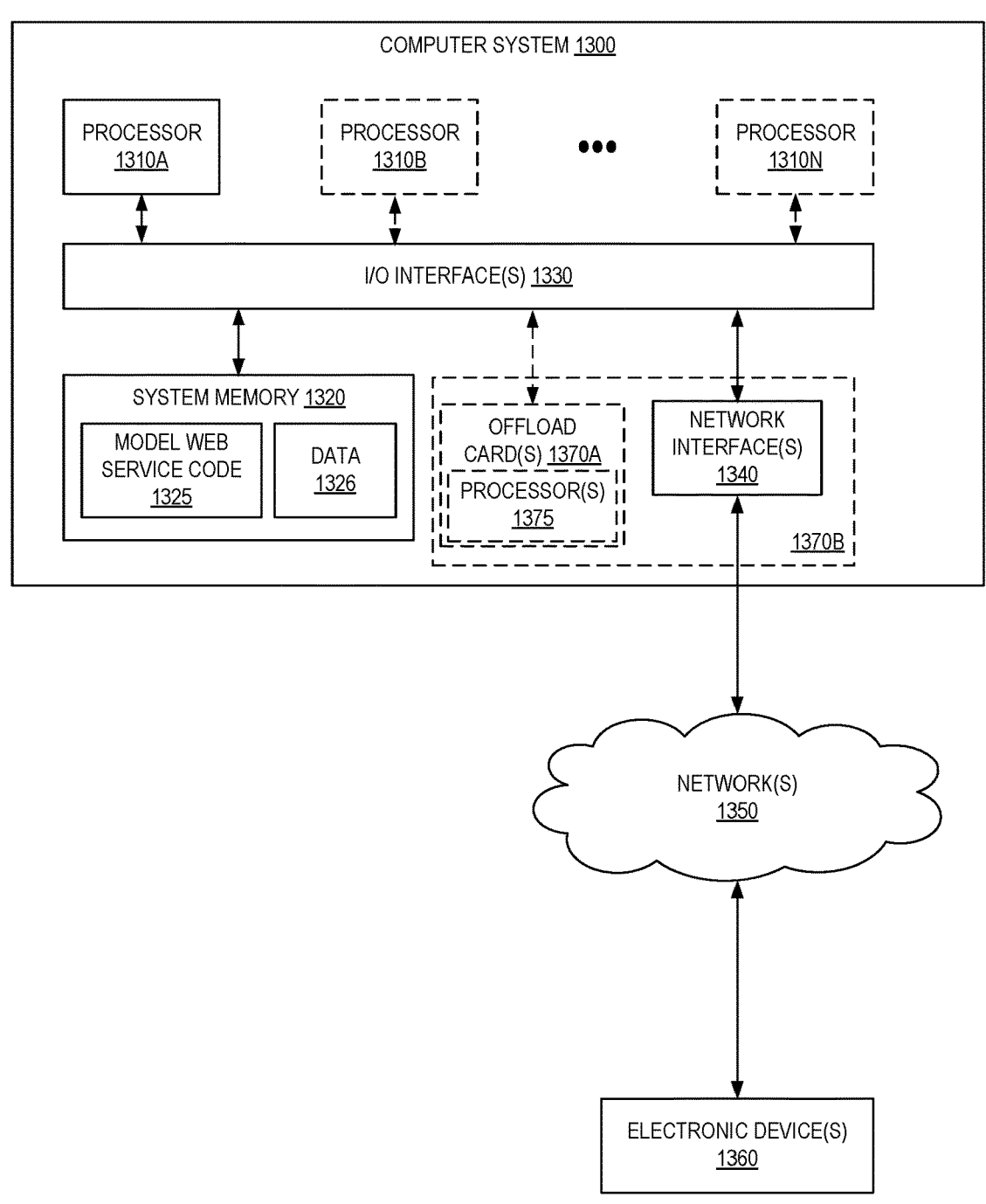
FIG. 13 is a block diagram illustrating an example computer system that can be used in some examples.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network. Illustrative Systems In some examples, a system that implements a portion or all of the techniques described herein can include a general-purpose computer system, such as the computer system 1300 illustrated in FIG. 13, that includes, or is configured to access, one or more computer-accessible media. In the illustrated example, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various examples the computer system 1300 can include one computing device or any number of computing devices configured to work together as a single computer system 1300.

In various examples, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as model web service code 1325 (e.g., executable to implement, in whole or in part, the model web service 210) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 2, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computer system 1300. However, in some examples the virtualization manager implemented by the offload card(s) 1370A or 1370B can accommodate requests from other entities (e.g., from compute instances themselves), and cannot coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request to generate a model web;
building a model web according to the request by:
    selecting a plurality of models for the model web from one or more available model types based on at least one or more of availability, tensor information, and compute type,
    determining that the model web cannot be built from available models,
    determining, in response to determining that the model web cannot be built, that there is a tensor compatibility issue based on at least the tensor information,
    selecting one or more tensor conformers based on at least the tensor information,
    instantiating synapses between the selected plurality of models and the one or more tensor conformers to form the model web, wherein the synapses comprise connections between different models of the selected plurality of models and the one or more tensor conformers,
    updating information regarding availability of the selected plurality of models of the model web to indicate being in use; and
maintaining the model web based on usage of the selected plurality of models; and
receiving input data and applying the model web to generate a result.

2. The computer-implemented method of claim 1, wherein the request includes one or more of: a model web template, an indication of one or more input sources, a description of input tensor(s), an indication of where to store a result of the model web, an indication of a location for models of the model web, an indication of a type of compute to use for one or more models of the model web, a model web definition, and an indication of strength metrics to use.

3. The computer-implemented method of claim 1, wherein selecting the plurality of models for the model web from one or more available model types is further based on a location of the models provided by the request.

4. A computer-implemented method comprising:
receiving a request to generate a model web; and
building a model web according to the request by:
    selecting a plurality of models for the model web from one or more available model types based on at least one or more of availability, tensor information, and compute type,
    determining that the model web cannot be built from available models,
    determining, in response to determining that the model web cannot be built, that there is a tensor compatibility issue based on at least the tensor information,
    selecting one or more tensor conformers based on at least the tensor information;
    instantiating synapses between the selected plurality of models and the one or more tensor conformers to form the model web, wherein the synapses comprise connections between different models of the selected plurality of models and the one or more tensor conformers, and
    updating information regarding availability of the selected plurality of models of the model web to indicate being in use.

5. The computer-implemented method of claim 4, wherein building the model web according to the request further comprises:
    determining which model types are needed to build the model web, wherein selecting the plurality of models comprises selecting models from the determined model types.

6. The computer-implemented method of claim 4, wherein building the model web according to the request further comprises:
    determining the model web can be built from available models using the one or more tensor conformers.

7. The computer-implemented method of claim 4, wherein the request includes one or more of: a model web template, an indication of one or more input sources, a description of input tensor(s), an indication of where to store a result of the model web, an indication of a location for models of the model web, an indication of a type of compute to use for one or more models of the model web, a model web definition, and an indication of strength metrics to use.

8. The computer-implemented method of claim 7, wherein selecting the plurality of models for the model web from one or more available model types is further based on the location of the models provided by the request.

9. The computer-implemented method of claim 7, wherein the model web template defines a model web by model types and connections between model types.

10. The computer-implemented method of claim 7, wherein the model web definition defines a model web by indicating explicit models of the model web and connections between the models.

11. The computer-implemented method of claim 4, wherein the model web is maintained by updating model information as models become available or unavailable and utilizing model synapse strength indicators to determine when a synapse is broken.

12. The computer-implemented method of claim 4, wherein the availability and tensor information are published by models.

13. The computer-implemented method of claim 4, wherein the availability and tensor information are maintained by an orchestrator.

14. The computer-implemented method of claim 4, wherein determining that there is a tensor compatibility issue comprises:
    determining that an output of a first selected model of the plurality of models does not match an input of second selected model of the plurality of models.

15. The computer-implemented method of claim 4, further comprising:
    receiving input data and applying the model web to generate a result.

16. A system comprising:
a first one or more electronic devices to implement a model hosting service in a multi-tenant provider network; and
a second one or more electronic devices to implement a model web service in the multi-tenant provider network, the model web service including instructions that upon execution cause the model web service to:
receive a request to generate a model web; and
build a model web to be hosted by the model hosting service according to the request by:
    selecting a plurality of models for the model web from one or more available model types based on at least one or more of availability, tensor information, and compute type,
    determining that the model web cannot be built from available models,
    determining, in response to determining that the model web cannot be built, that there is a tensor compatibility issue based on at least the tensor information,
    selecting one or more tensor conformers based on at least the tensor information,
    instantiating synapses between the selected models and the one or more tensor conformers to form the model web, wherein the synapses comprise connections between different models of the selected plurality of models and the one or more tensor conformers, and
    updating information regarding availability of the selected plurality of models of the model web to indicate being in use.

17. The system of claim 16, wherein to build the model web according to the request further comprises to determine which model types are needed to build the model web, wherein selecting the plurality of models comprises selecting models from the determined model types.

18. The system of claim 16, wherein the request includes one or more of: a model web template, an indication of one or more input sources, a description of input tensor(s), an indication of where to store a result of the model web, an indication of a location for models of the model web, an indication of a type of compute to use for one or more models of the model web, a model web definition, and an indication of strength metrics to use.

19. The system of claim 18, wherein the model web template defines a model web by model types and connections between model types.

20. The system of claim 18, wherein the model web definition defines a model web by indicating explicit models of the model web and connections between the models.

* * * * *